United States Patent [19]
Yeh

[11] Patent Number: 6,085,819
[45] Date of Patent: Jul. 11, 2000

[54] MACHINE FOR JOINING PLASTIC FOAM SLABS

[76] Inventor: Ten-Fu Yeh, No. 53, Alley 87, Lane 538, An-Ho Road, Sec. 4, Tainan, Taiwan

[21] Appl. No.: 09/154,865

[22] Filed: Sep. 16, 1998

[51] Int. Cl.[7] .............................. B32B 31/20; B30B 15/34
[52] U.S. Cl. ...................... 156/499; 156/556; 156/583.1
[58] Field of Search .................................... 100/320, 315, 100/316, 317, 318, 319; 156/583.1, 299, 297, 303, 499, 556, 583.2, 583.6, 558

[56] References Cited

U.S. PATENT DOCUMENTS 3,005,402  10/1961  Starger et al. ........................ 100/322
5,555,798   9/1996  Miyashita et al. ..................... 100/318

Primary Examiner—Richard Crispino
Assistant Examiner—George R. Koch, III
Attorney, Agent, or Firm—Rosenberg, Klein & Lee

[57] ABSTRACT

A machine includes a frame having a first vertical track, a second vertical track, and a horizontal guiding device. A lower press plate is movably guided by the first vertical track. An upper press plate is movably guided by the second vertical track. The upper press plate and the lower press plate may tightly hold two plastic foam slabs therebetween. A heating blade is heated and passed through an interface between the two plastic foam slabs to join the plastic foam slabs together.

6 Claims, 11 Drawing Sheets

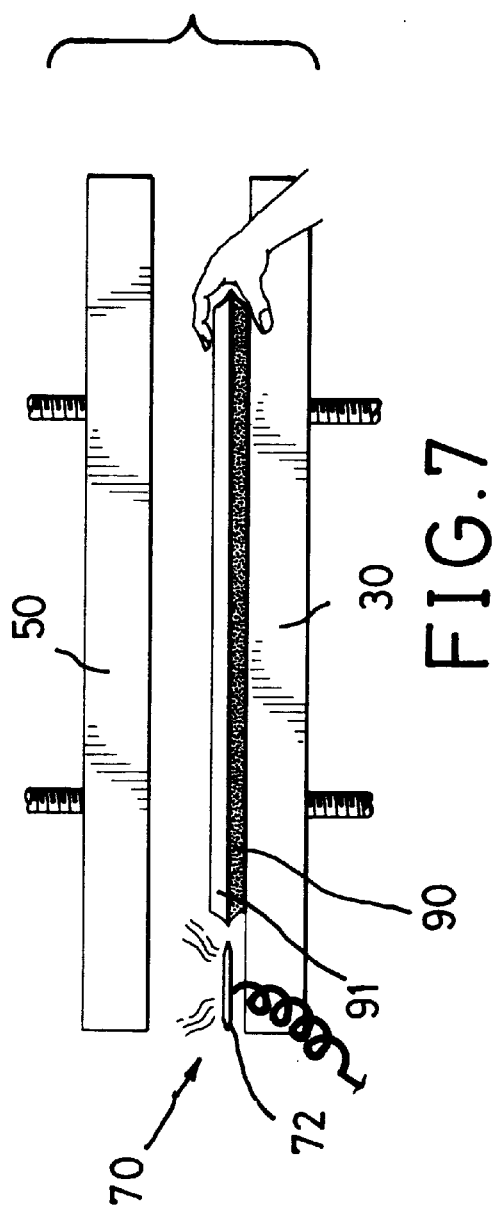
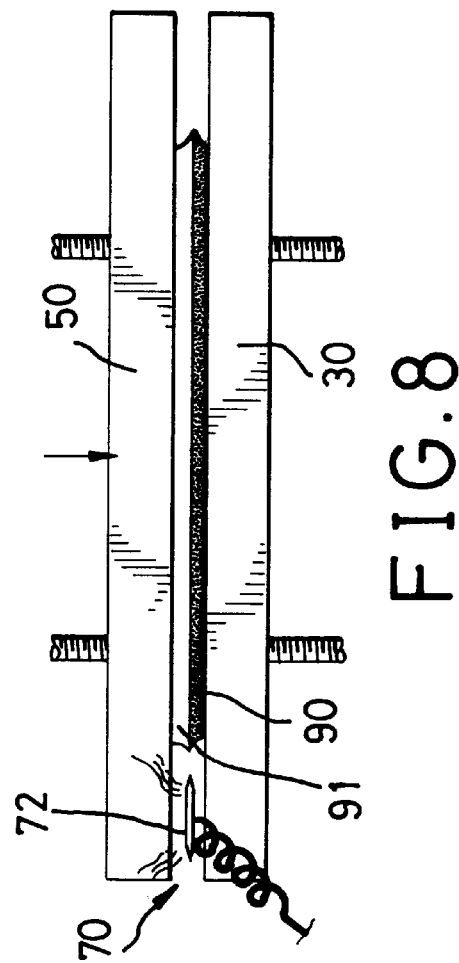

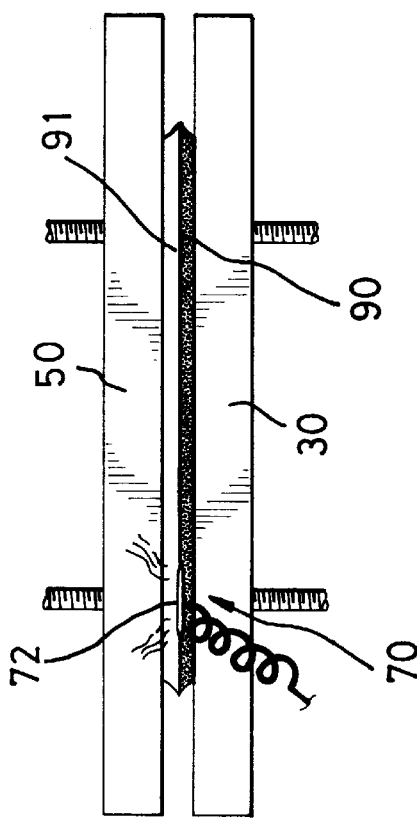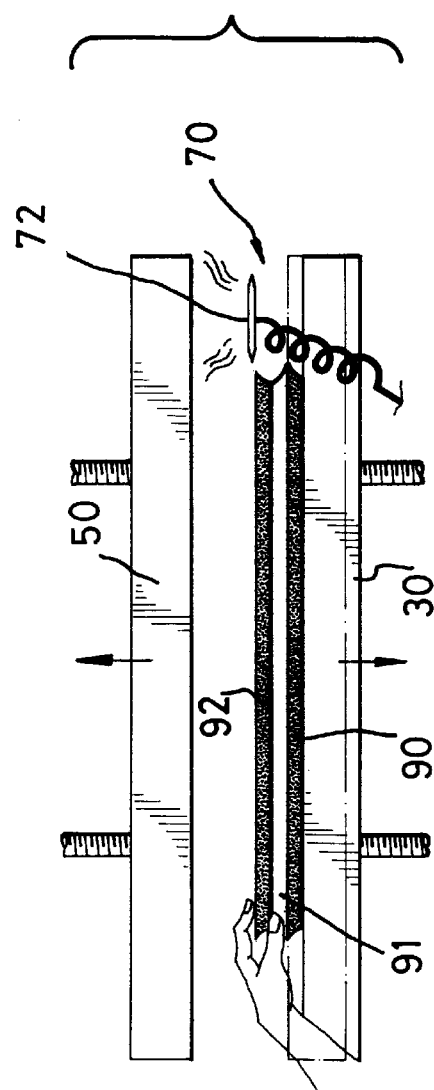

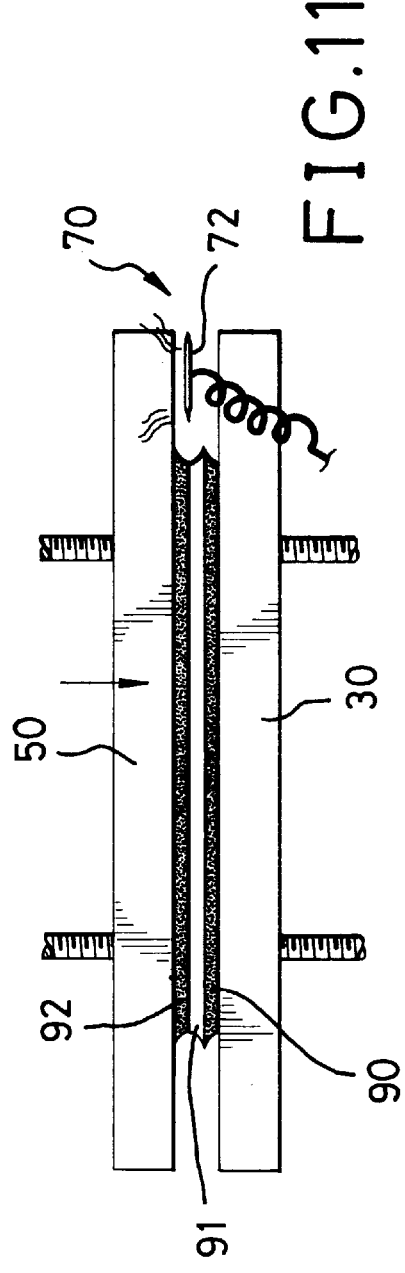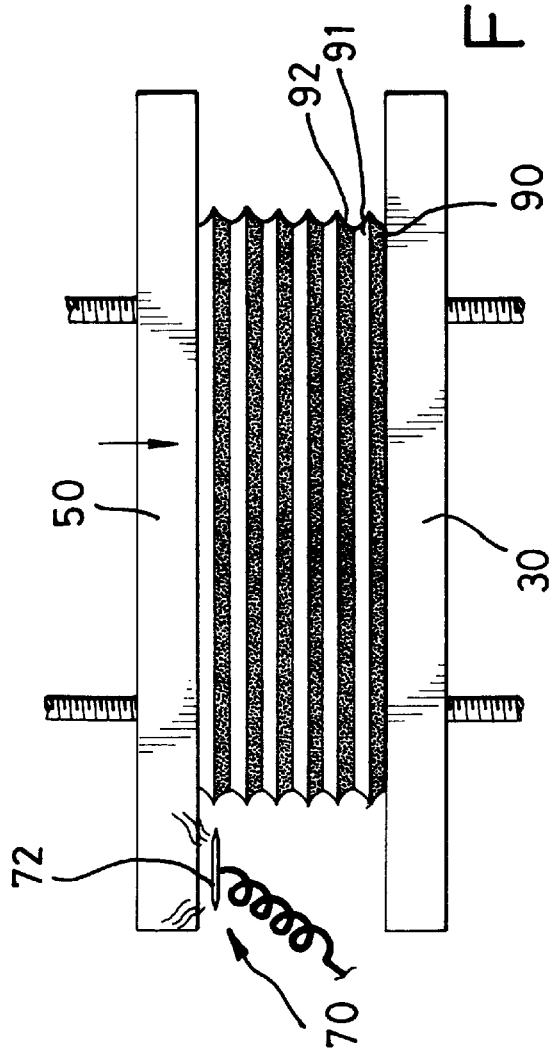

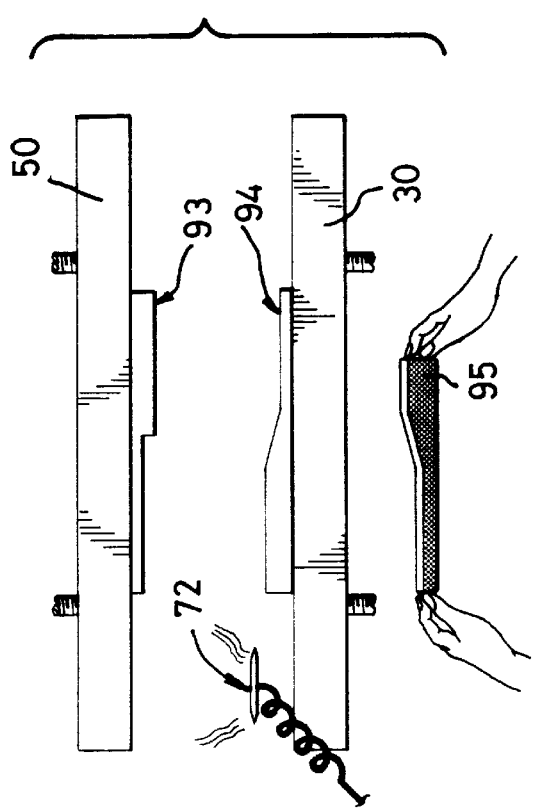
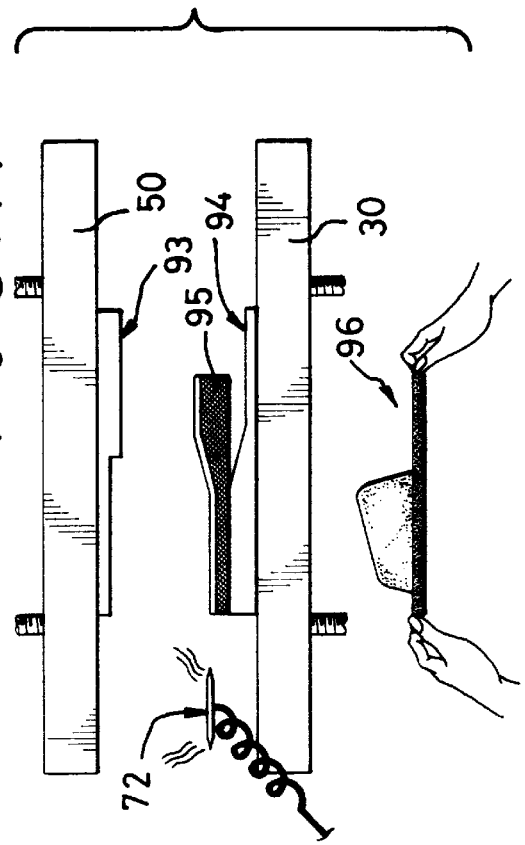

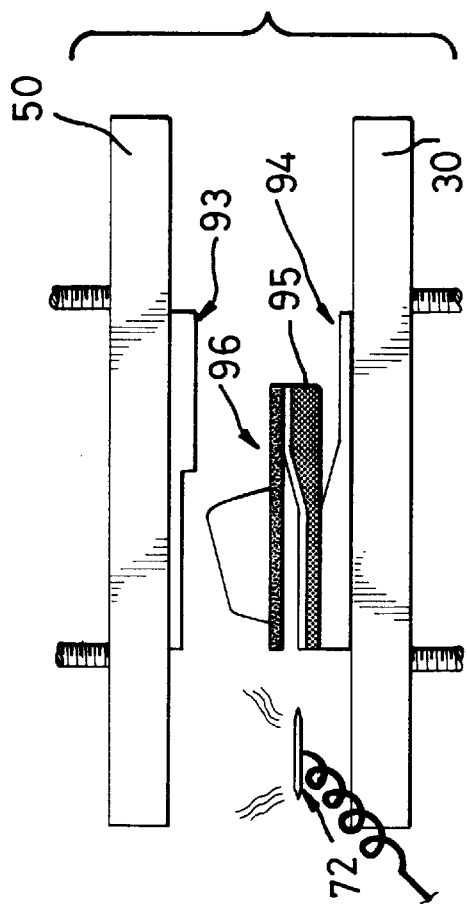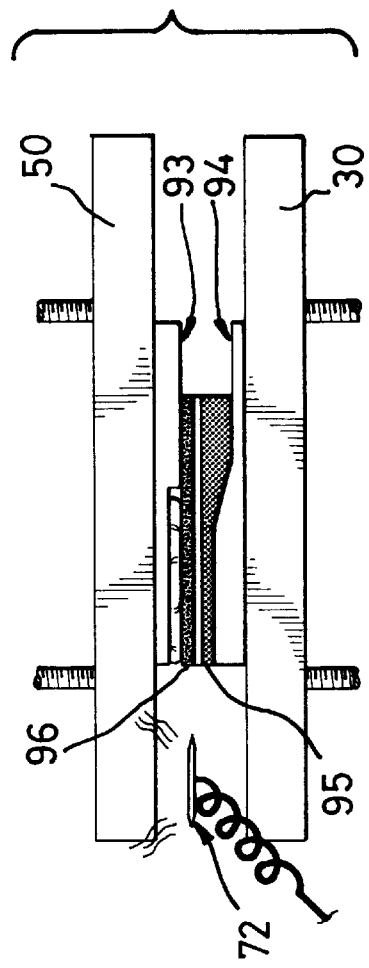

MACHINE FOR JOINING PLASTIC FOAM SLABS

BACKGROUND OF THE INVENTION

1 Field of the Invention

The present invention relates to a machine for joining plastic foam slabs.

2. Description of the Related Art

Plastic foam slabs of polyethylene (PE) or ethylene vinyl acetate (EVA) are widely used to make daily articles, e.g., floor plates, slippers, etc., as they are light and may absorb impact. Conventionally, adhesive is applied to a surface of each of two foam slabs to be joined. The foam slabs are heated and then joined by labor for subsequent pressing by a press machine. Repetitive operation may join a number of foam slabs, and the foam slabs may have different colors. Nevertheless, the productivity is low, as labor is required in application of adhesive and joining of foam slabs. In addition, the production line required for joining foam slabs occupies a considerable space, and the overall cost for land, machinery, and labor is extremely high. It is therefore a long and unfulfilled need for an improved machine to solve the above problems.

SUMMARY OF THE INVENTION

It is a primary object of the present invention to provide a machine for joining plastic foam slabs that requires less intensive labor work.

In accordance with the present invention, a machine is provided for joining two plastic foam slabs. The machine comprises a frame including a first vertical track means, a second vertical track means, and a horizontal guiding means. A lower press plate is movably guided by the first vertical track means, and means is provided for controlling vertical movement of the lower press plate in the first vertical track means. An upper press plate is movably guided by the second vertical track means, and means is provided for controlling vertical movement of the upper press plate in the second vertical track means so as to tightly hold two plastic foam slabs between the upper press plate and the lower press plate. A heating blade is heated and passed through an interface between the two plastic foam slabs, and means is provided for moving the heating blade along the horizontal guiding means.

The heating blades has electric wires attached to two ends thereof to move therewith, and further comprises a flexible protective hollow casing for housing the electric wires. The flexible protective hollow casing includes a plurality of sections to allow bending thereof.

The means for moving the heating blade includes two shafts respectively mounted to two ends of the frame and each having two ends that are connected by two belts. A motor is provided for driving one of the shafts. The heating blade has two ends respectively, securely attached to the belts to move therewith. In a preferred embodiment of the invention, the horizontal guiding means includes a pair of horizontal rods provided on each of two lateral sides of the frame. Each end of the heating blade has two sliders securely attached thereto. Each slider is respectively, slidably movable along an associated horizontal rod. The two sliders is secured together and securely connected to an associated belt to move therewith.

The upper press plate may further include an upper mold secured to an underside thereof, while the lower press plate may further include a lower mold secured to an upper side thereof for making slippers or the like.

Other objects, advantages, and novel features of the invention will become more apparent from the following detailed description when taken in conjunction with the accompanying drawings.

BRIEF DESCRIPTION OF THE DRAWINGS

FIGS. 7 to 12 are schematic side views illustrating joining of plastic foam slabs in accordance with the present invention; and FIGS. 13 to 16 are schematic side views illustrating production of a slipper by joining plastic foam slabs in accordance with the present invention.

DETAILED DESCRIPTION OF THE PREFERRED EMBODIMENT

Figure 1:
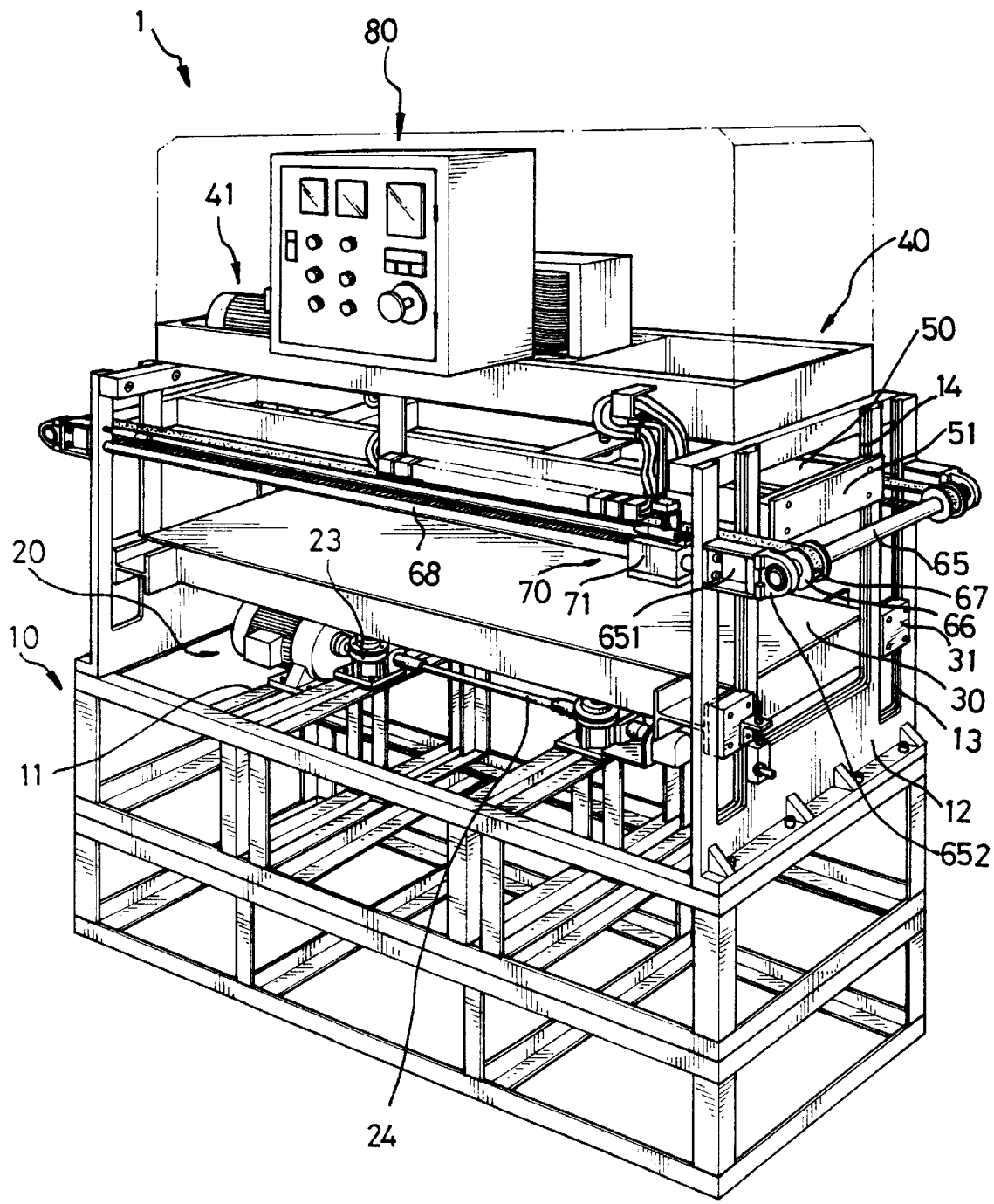
FIG. 1 is a perspective view of a machine for joining plastic foam slabs in accordance with the present invention.
Figure 2:
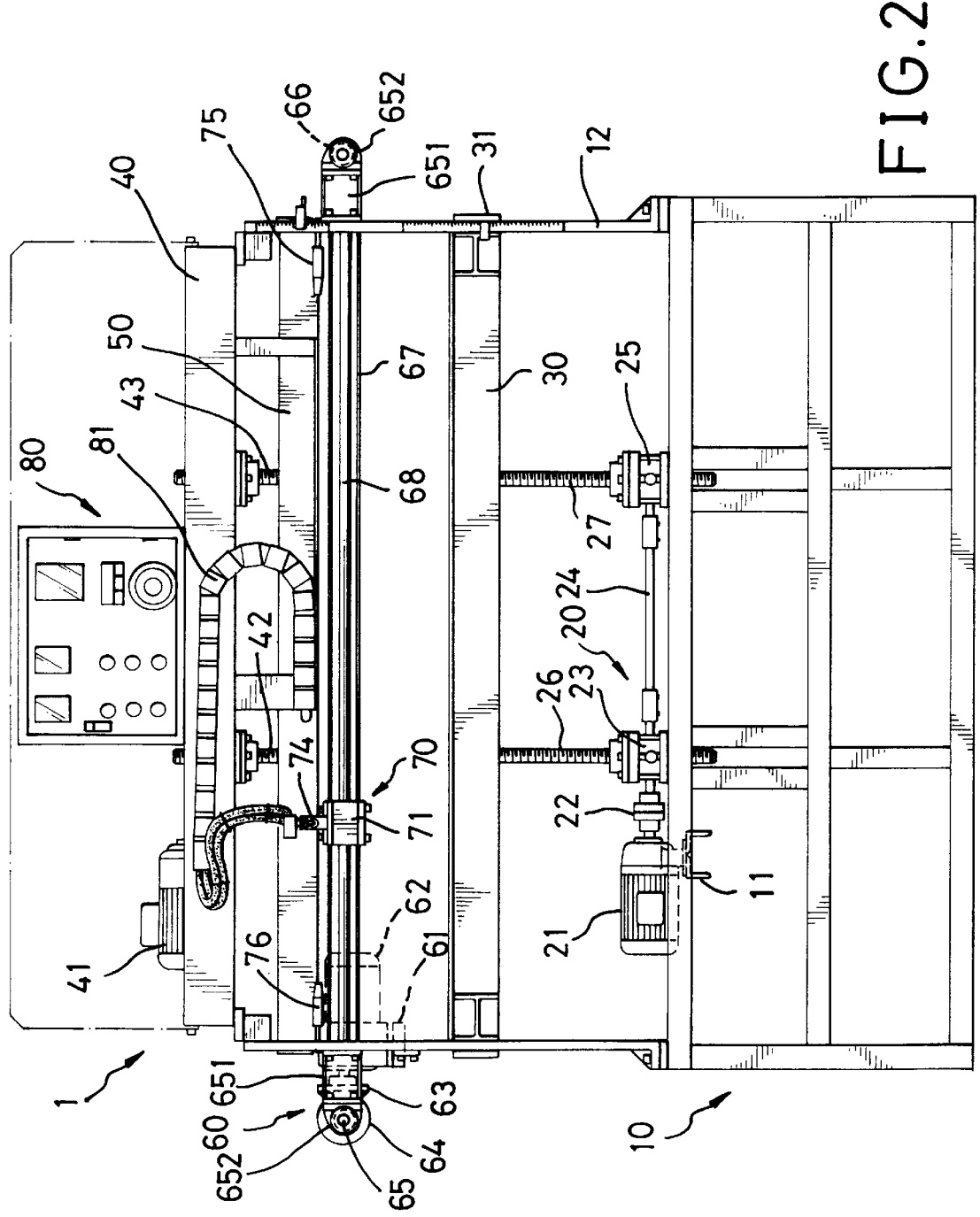
FIG. 2 is a side view of the machine of the present invention.

Referring to the drawings and initially to FIGS. 1 and 2, a machine 1 for joining plastic foam slabs in accordance with the present invention generally includes a frame 10 having a lower press plate 30 and an upper press plate 50. The frame 10 includes two opposite side plates 12 each having a pair of tracks 13 on two ends thereof The lower press plate 30 has a block 31 formed on each of four corners thereof and slidably received in an associated track 13.

A first elevating means 20 is mounted on a subframe 11 of the frame 10 and includes a motor 21, a coupler 22, a transmission rod 24, two direction converters 23 and 25 respectively mounted to two ends of the transmission rod 24, and two screw rods 26 and 27 the lower ends of which are respectively connected to the direction converters 23 and 25. The upper ends of the screw rods 26 and 27 are connected to the lower press plate 30 in a way such that the screw rods 26 and 27 are rotated to move the lower press plate 30 downwardly or upwardly upon rotation of the motor 21. It is appreciated that other types of transmission means can be used to move the lower press plate 30.

Mounted on top of the side plates 12 is a seat 40 for mounting a control box 80 and a second elevating means 41. The second elevating means 41 is identical to the first elevating means 20 and includes two screw rods 42 and 43 that are connected to the upper press plate 50 in a way such that the screw rods 42 and 43 are rotated to move the upper press plate 50 downwardly or upwardly upon rotation of the motor (not labeled) of the second elevating means 41. It is appreciated that other types of transmission means can be used to move the lower press plate 30. In this embodiment, the upper press plate 50 includes two sliding boards 51 mounted to two sides, respectively, while the side plates 12 have tracks 14 for sliding engagement with the sliding boards 51, respectively.

Figure 3:
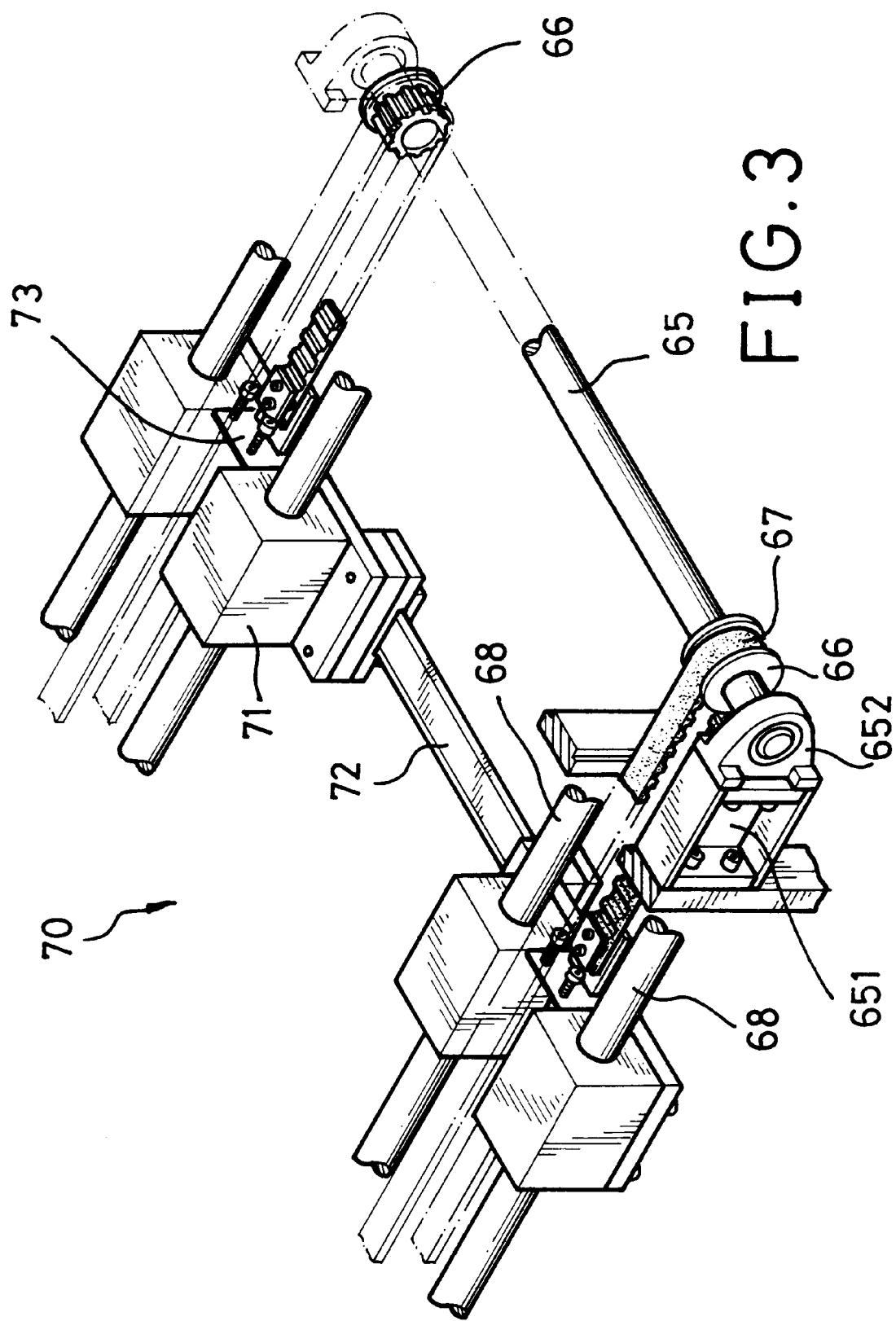
FIG. 3 is a perspective view of a heating device of the machine of the present invention.
Figure 4:
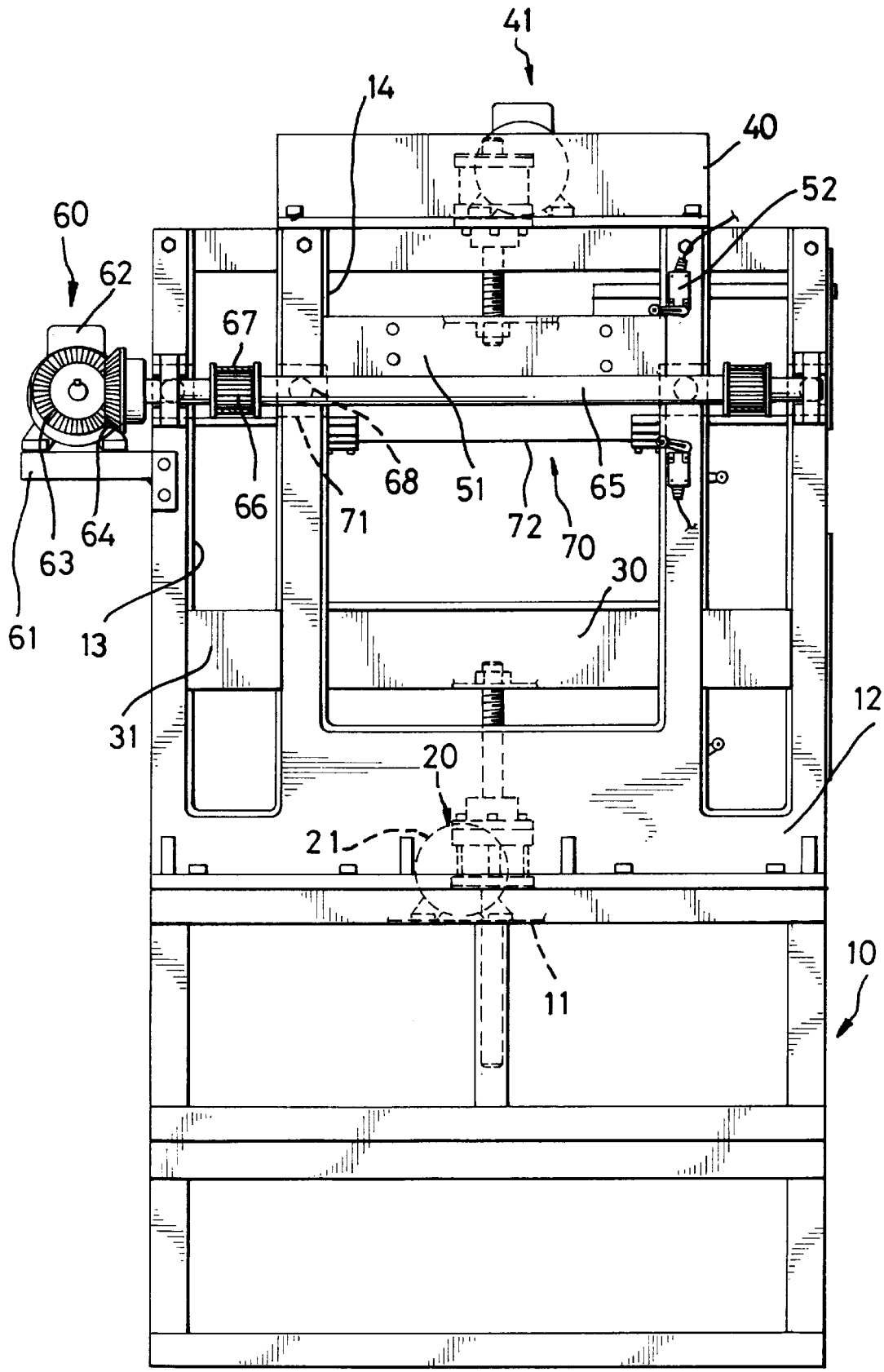
FIG. 4 is a left side view of the machine in FIG. 2.

A heating device 70 is mounted between the upper press plate 50 and the lower press plate 30. As shown in FIG. 3, the heating device 70 includes a heating blade 72 and a pair of sliders 71 secured to each of two ends of the heating blade 72. The frame 10 includes two horizontal rods 68 on each of two lateral sides thereof so as to allow the sliders 71 to slide therealong. A means 60 is provided to move the heating device 70 in the horizontal direction. The means 60 includes a motor 62 secured on a bracket 61 (FIGS. 4 and 5) attached to one of the side plates 12 of the frame 10. A bevel gear 63 is mounted to an output shaft (not labeled) of the motor 62. Each side plate 12 further includes a pair of seats 651 secured thereto. Each seat 651 includes a bearing seat 652 for receiving an end of a shaft 65, best shown in FIG. 3. The two shafts 65 are connected by two belts 67. Each belt 67 is secured between a pair of sliders 71 to move therewith. As shown in FIG. 4, one of the two shafts 65 has a bevel gear 64 formed thereon for engaging with the bevel gear 63 of the motor 62. By such an arrangement, when the motor 62 operates, the shafts 65 are rotated. As a result, the sliders 71 and the heating blade 72 are moved horizontally by the belts 67. The belt 67 may be a tractor-type belt that has teeth on an inner periphery thereof for engaging with the teeth on a gear 66 formed on each of two ends of the associated shaft 65. Nevertheless, conventional chains and sprockets can be used.

Figure 5:
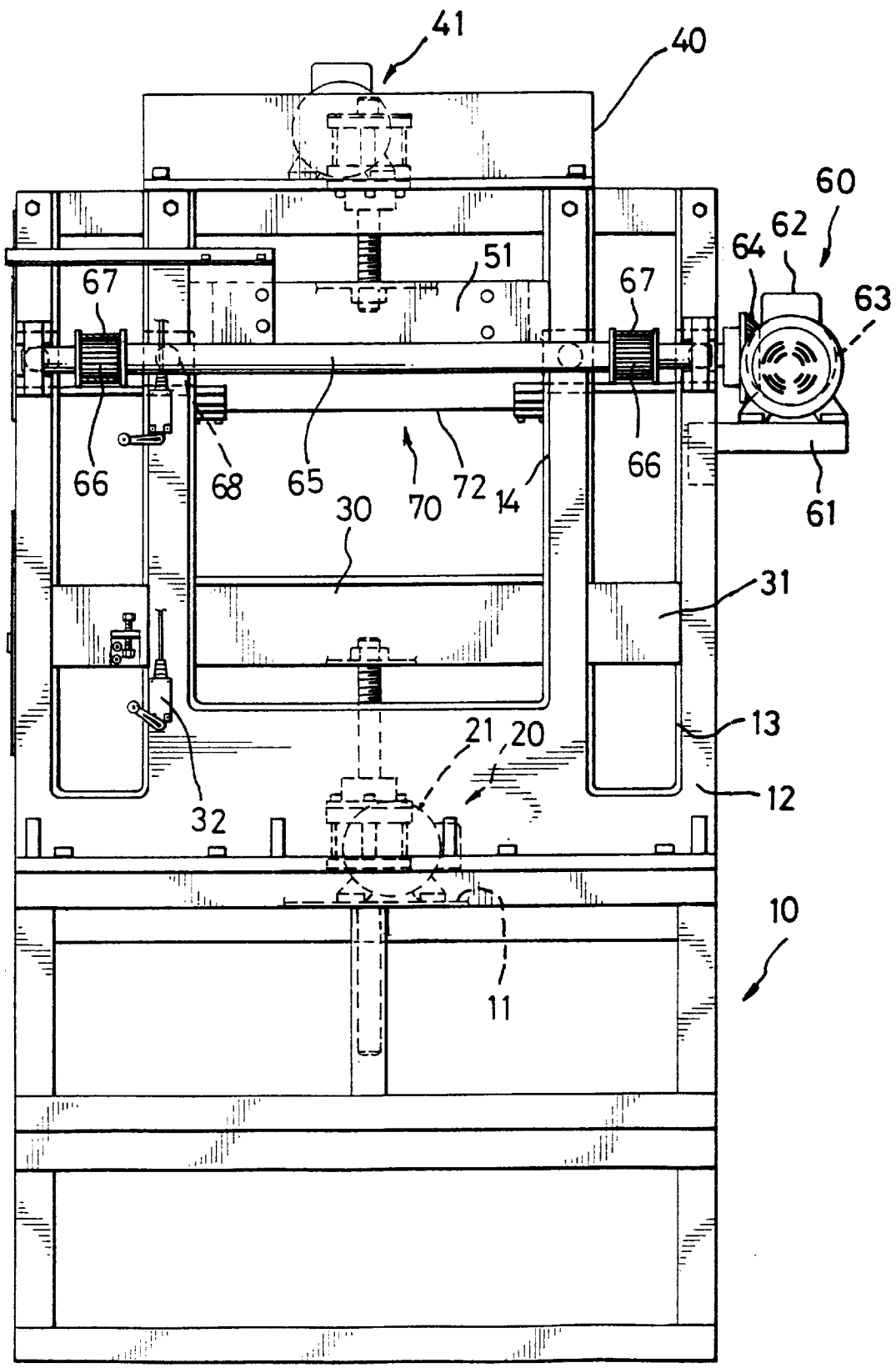
FIG. 5 is a right side view of the machine in FIG. 2.
Figure 6:
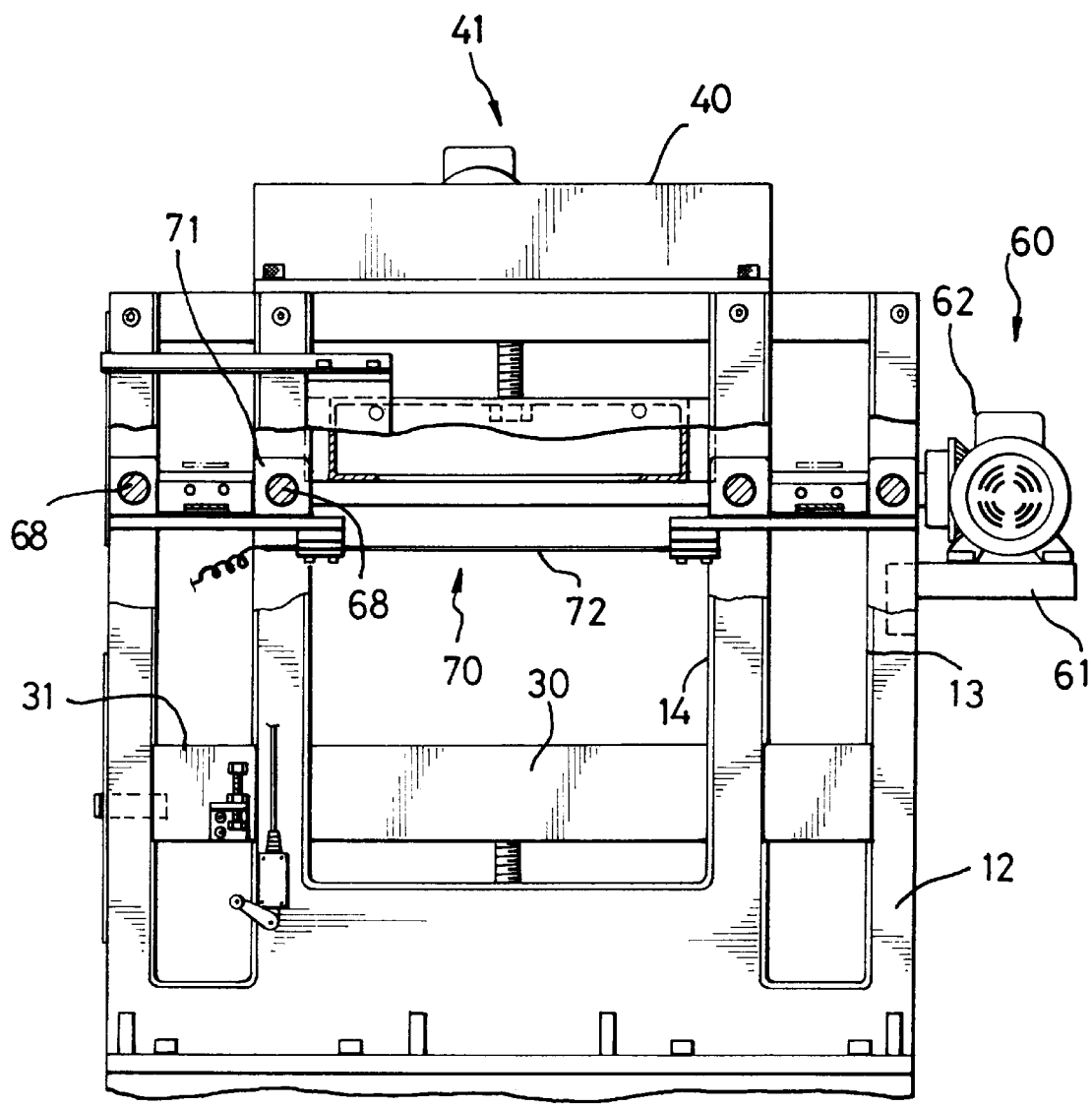
FIG. 6 is a side view, partly sectioned, illustrating a portion of the machine in FIG. 5.

The control box 80 includes a number of buttons for controlling, e.g., temperature of the heating blade 72, and the vertical displacements of the upper and lower press plates 50 and 30. In addition, digital display means can be used to synchronously display the displacement of the upper and lower press plates 50 and 30. As shown in FIGS. 4 and 5, at least one of the side plates 12 may include limit switches 32 and 52 mounted thereon to control maximum vertical movements of the lower and upper press plates 30 and 50. Furthermore, as shown in FIG. 2, at least one of the two lateral sides of the frame 10 includes a stop 75, 76 on each of two ends thereof When a micro-switch 74 impinges the stop 75 or 76, a signal is sent to the control box 80 such that further horizontal movement of the heating blade 72 is avoided as the power supply to the motor 62 is stopped. It is noted that electric wires (not labeled) connected to the heating blade 70 are guided and protected in two flexible protective hollow chain means 81 on each of two lateral sides of the frame 10. Each flexible protective hollow chain means 81 includes a number of hollow sections to allow bending thereof and to protect the electric wires therein during horizontal displacement of the heating blade 72.

Operation of the machine is described as follows.

The thickness of each of two plastic foam slabs 90 and 91 of different (or same) colors to be joined is measured and inputted into the control box 80. The lower press plate 30 is moved to a desired level according to the thickness of the lower slab 90. Referring to FIG. 7, two plastic foam slabs 90 and 91 are placed on the lower press plate 30. Then, the upper press plate 50 is lowered to hold the slabs 90 and 91 tightly between the press plates 30 and 50, as shown in FIG. 8. Then, the heating blade 72 of the heating device 70 is heated to a desired temperature and passed through an interface between the slabs 90 and 91 and thus joins the slabs 90 and 91 together. The slabs 90 and 91 can be reliably joined together as they are pressed tightly by the press plates 30 and 50. Thus, a laminated (two-layer) plastic foam slab of two colors is produced.

After moving the upper press plate 50 upwardly, a third slab 92 may be placed on the joined slab, and the above-mentioned steps are repeated to join the third slab 92 to the two joined slabs 90 and 91, as shown in FIGS. 10 and 11. Repetitive operation may produce a multi-layer plastic foam slab, best shown in FIG. 12.

FIGS. 13 to 16 illustrate production of a slipper. As shown in FIG. 13, an upper mold 93 is securely attached to an underside of the upper press plate 50 while a lower mold 94 is securely attached to an upper side of the lower press plate 30. A sole 95 is placed on the lower mold 94,(FIG. 14), and a shoe upper 96 is placed on the sole 95 (FIG. 15). Then, the upper press plate 50 is moved downwardly to tightly press the sole 95 and the shoe upper 96. Next, the heating blade 72 is heated to a desired temperature and passed through an interface between the sole 95 and the shoe upper 96 to join them together.

According to the above description, it is appreciated that the machine for joining plastic foam slabs of the present invention may save labor work, time, and cost, and improve productivity. In addition, the machine of the present invention merely occupies a relatively small space.

Although the invention has been explained in relation to its preferred embodiment, it is to be understood that many other possible modifications and variations can be made without departing from the spirit and scope of the invention as hereinafter claimed.

What is claimed is:

1. A machine for joining two plastic foam slabs, comprising:

a frame including a first vertical track means, a second vertical track means, and a horizontal guiding means, a lower press plate movably guided by the first vertical track means, means for controlling vertical movement of the lower press plate in the first vertical track means, an upper press plate movably guided by the second vertical track means, means for controlling vertical movement of the upper press plate in the second vertical track means so as to be adapted to tightly press two plastic foam slabs between the upper press plate and the lower press plate, a heating blade adapted to be heated and passed through an interface between the two plastic foam slabs, and means for moving the heating blade along the horizontal guiding means.

2. The machine as claimed in claim 1, wherein the heating blades has electric wires attached to two ends thereof to move therewith, and further comprises a flexible protective hollow casing for housing the electric wires.

3. The machine as claimed in claim 2, wherein the flexible protective hollow casing includes a plurality of sections.

4. The machine as claimed in claim 1, wherein the means for moving the heating blade includes two shafts respectively mounted to two ends of the frame and each having two ends that are connected by two belts, and a motor for driving one of the shafts, and wherein the heating blade has two ends respectively, securely attached to the belts to move therewith.

5. The machine as claimed in claim 4, wherein the horizontal guiding means includes a pair of horizontal rods provided on each of two lateral sides of the frame, and each said end of the heating blade has two sliders securely attached thereto, each said slider being respectively, slidably movable along an associated said horizontal rod, the two sliders being secured together and securely connected to an associated said belt to move therewith.

6. The machine as claimed in claim 1, wherein the upper press plate further includes an upper mold secured to an underside thereof, while the lower press plate further includes a lower mold secured to an upper side thereof.

* * * * *